United States Patent
Waechter et al.

(10) Patent No.: US 10,074,212 B2
(45) Date of Patent: Sep. 11, 2018

(54) DECORRELATION OF LOW DISCREPANCY SEQUENCES FOR PROGRESSIVE RENDERING

(71) Applicant: Nvidia Corporation, Santa Clara, CA (US)

(72) Inventors: Carsten Waechter, Berlin (DE); Nikolaus Binder, Berlin (DE)

(73) Assignee: Nvidia Corporation, Santa Clara, CA (US)

(*) Notice: Subject to any disclaimer, the term of this patent is extended or adjusted under 35 U.S.C. 154(b) by 77 days.

(21) Appl. No.: 15/222,152

(22) Filed: Jul. 28, 2016

(65) Prior Publication Data

US 2017/0032566 A1  Feb. 2, 2017

Related U.S. Application Data

(60) Provisional application No. 62/198,884, filed on Jul. 30, 2015.

(51) Int. Cl.
  *G06T 15/50* (2011.01)

(52) U.S. Cl.
  CPC .................. *G06T 15/506* (2013.01)

(58) Field of Classification Search
  None
  See application file for complete search history.

(56) References Cited

U.S. PATENT DOCUMENTS

| 2013/0194268 A1* | 8/2013 | Wachter ............... G06T 15/50 345/426 |
| 2013/0207978 A1* | 8/2013 | Keller .................. G06T 15/50 345/426 |
| 2014/0146050 A1 | 5/2014 | Raab et al. |

FOREIGN PATENT DOCUMENTS

WO   2009044282 A2   4/2009

OTHER PUBLICATIONS

Keller, A., "Quasi-Monte Carlo Image Synthesis in a Nutshell," Part II of book—Monte Carlo and Quasi-Monte Carlo Methods 2012, Nov. 8, 2013, pp. 213-249, vol. 65.

* cited by examiner

*Primary Examiner* — Vu Nguyen

(57) ABSTRACT

A method and renderer for a progressive computation of a light transport simulation are provided. The method includes the steps of employing a low discrepancy sequence of samples; and scrambling an index of the low discrepancy sequence independently per region using a hash value based on coordinates of a respective region, wherein for each set of a power-of-two number of the samples, the scrambling is a permutation.

21 Claims, 3 Drawing Sheets

DECORRELATION OF LOW DISCREPANCY SEQUENCES FOR PROGRESSIVE RENDERING

CROSS-REFERENCE TO RELATED APPLICATION

This application claims the benefit of U.S. Provisional Application Ser. No. 62/198,884, by Waechter, et al., on Jul. 30, 2015, entitled "DECORRELATION OF QUASI-MONTE CARLO SEQUENCES FOR PROGRESSIVE RENDERING," commonly assigned with this application and incorporated herein by reference.

TECHNICAL FIELD

This application is directed, in general, to rendering an image and, more specifically, to performing a light transport simulation.

BACKGROUND

Traditionally, light transport simulation has been used to enhance visual realism of generated images. For example, light transport simulation has been used to generate realistic images by tracing paths of light through the pixels of an image plane. However, current techniques for performing light transport simulation have various limitations.

For example, current methods for performing light transport simulation use a deterministic/quasi-Monte Carlo method to improve convergence speed over a random number/Monte Carlo based method. But due to the deterministic nature of the low-discrepancy sequences of the quasi-Monte Carlo method, such methods produce transient artifacts that become visible during rendering. These artifacts interfere with a user's perception of a generated image and degrade the visual realism of the generated image. Thus, there is a need for addressing these limitations of the current methods.

SUMMARY

One aspect provides a method of enhancing a progressive computation of a light transport simulation using a function with a set of regions as a domain. In one embodiment, the method includes the steps of: 1) employing a low discrepancy sequence of samples and 2) scrambling an index of the low discrepancy sequence independently per region using a hash value based on coordinates of a respective region. For each set of a power-of-two number of the samples, the scrambling step is a permutation.

Another aspect provides a method for a progressive computation of a light transport simulation. In one embodiment, the method includes the steps of: 1) employing a function with a set of regions of an image plane as a domain, 2) scrambling an index of a low discrepancy sequence of samples of one region of the regions independently of other regions of the regions using a hash value based on coordinates of the one region, and 3) computing a value for the one region of the image plane using the function and the samples. For each set of a power-of-two number of the samples, the scrambling step is a permutation.

Yet another aspect provides a renderer for a progressive computation of a light transport simulation. The renderer includes a processor and a non-transitory computer-readable storage medium storing instructions that, when executed by said processor, cause the processor to perform steps. The steps include: 1) employing a function with a set of regions as a domain, 2) scrambling an index of a low discrepancy sequence of samples of one region of the regions independently of other regions of the regions using a hash value based on coordinates of the one region, and 3) computing a value for the one region using the function and the samples. For each set of a power-of-two number of the samples, the scrambling step is a permutation.

BRIEF DESCRIPTION

Reference is now made to the following descriptions taken in conjunction with the accompanying drawings, in which.

DETAILED DESCRIPTION

As discussed above, transient artifacts that become visible during rendering are distracting to the viewers. One of the common ways to deal with these artifacts is hiding these artifacts by adding noise to the low-discrepancy sequences. The noise is introduced by scrambling and/or shifting samples of the sequences using a random number generator. Although found to be effective, the additional random number generator has also been found to be somewhat difficult to implement, especially on highly parallel system such as graphics processors, and, more importantly, negatively affects the convergence speed on the average, and even drastically in some instances.

Introduced herein are methods and apparatuses that hide these transient artifacts during rendering without sacrificing the overall convergence speed of the simulation. Realizing that a power-of-two number of samples in a low-discrepancy sequence in base two (2) are well-distributed in space, the disclosure introduces method/apparatus embodiments that use a deterministic permutation/scrambling that only scrambles the order of computations of samples in the low-discrepancy sequence per, for example, pixel and renders the exact same images when a power-of-two number of samples from the sequence is used. As such, the correlations between neighboring pixels are decorrelated during rendering, and the transient artifacts, which are caused by the correlations, become invisible. Moreover, as the number of samples being computed remains the same as before without the scrambling (the scrambling enumerates the same samples in different order for any power-of-two), the rendered image retains the same quality as before. As the deterministic permutation can be implemented using a simple hash function, the permutation is carried out on the fly without affecting the convergence speed as it fully retains the property and benefits of the low discrepancy sequences in base two (2).

Figure 1:
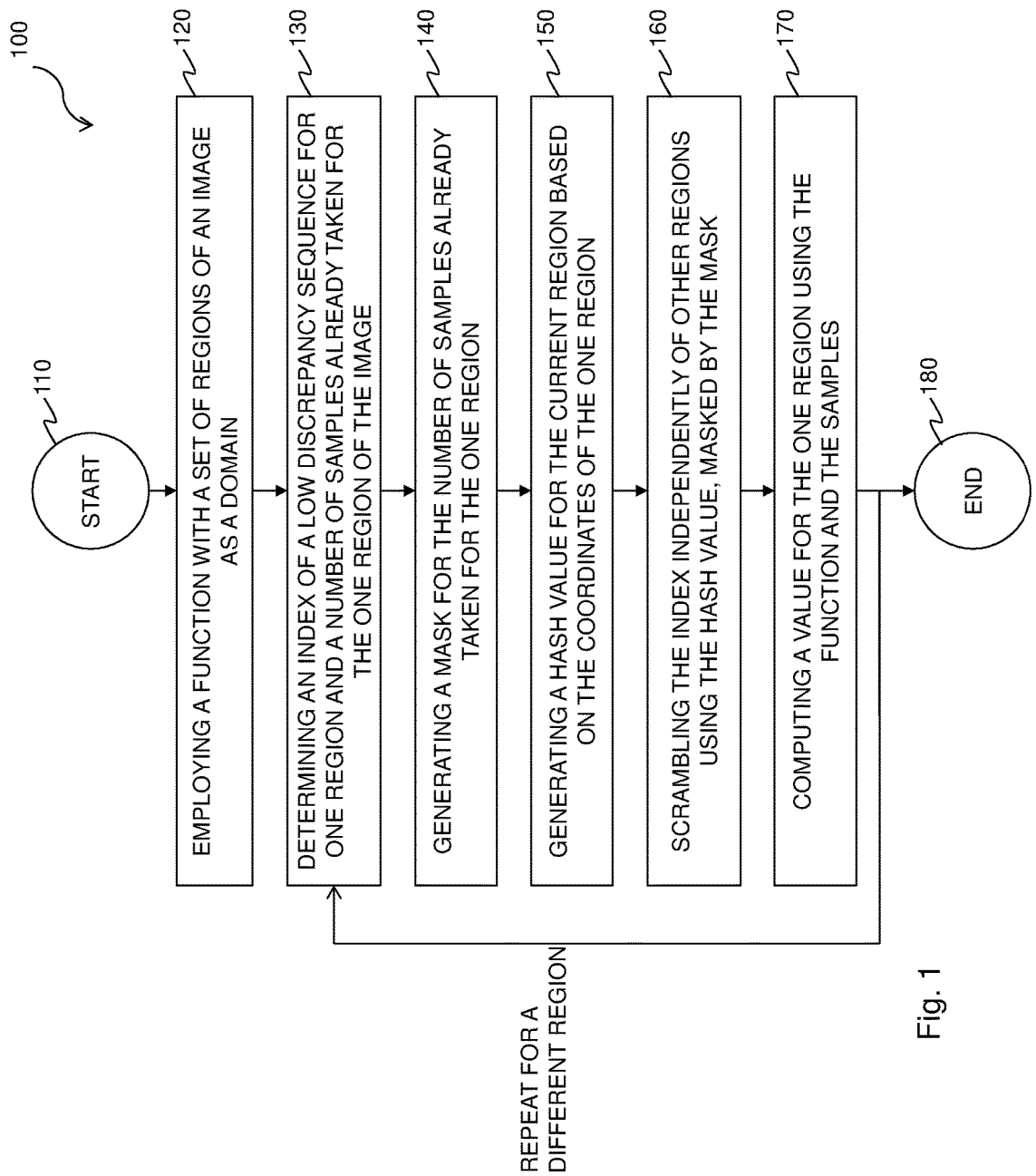
FIG. 1 is a flow diagram of one embodiment of a method of enhancing a progressive computation of a light transport simulation.

FIG. 1 is a block diagram of one embodiment of a method 100 of enhancing a progressive computation of a light transport simulation. In one embodiment, the method 100 may be performed by a processor of a renderer, which will be described in more details below with FIG. 3. In such an embodiment, the instructions that cause the processor to perform the steps of the method 100 may be stored in a non-transitory medium, which will also be described in more details below with FIG. 3. The method 100 starts at start step 110.

In step 120, a function with a set of regions of an image as a domain is employed. In one embodiment, the set of regions are a set of pixels of the image. In such an embodiment, each region of the set may correspond to each different pixel in the image. In another related embodiment, each region of the set may correspond to more than one pixel, e.g. when performing light tracing during the simulation.

In one embodiment, the low discrepancy sequence may include a plurality of sampled vectors found within the image. For example, each vector within the low discrepancy sequence may represent a light transport path that is sampled within the image (e.g. a light transport path sampled from a high-dimensional path space within an image plane, etc.).

In the illustrated embodiment, steps 130-160 are performed for one region independently of other regions using a hash value based on coordinates of the one region. In one embodiment, a different scrambling is selected per region such that the correlation between neighboring regions can be effectively removed.

In one embodiment, the low discrepancy sequence may be a (t,s)-sequence in base 2. In such an embodiment, the (t,s)-sequence may be a Sobol sequence. In yet another embodiment, the low discrepancy sequence is a (t, m, s)-net in base 2. In still yet another embodiment, the low discrepancy sequence may be a rank-1 lattice sequence.

In the step 130, an index of the low discrepancy sequence for the one region and a current sample number, i.e. a number of samples already taken for this region of the image, are determined. Using the current sample number, a mask is generated for the current sample number in the step 140. In the step 150, the hash value for the one region is generated based on the coordinates of the one region.

In one embodiment, the hash value is generated from a crapwow function that takes the x and y coordinates of the one region as two arguments. In other embodiments, a different hash function, including conventional hash functions, may be selected to improve the perception of the image plane by the human visual system. Also, inputs for the selected hash functions are not limited to two dimensions, e.g. x and y coordinates, and may even be one dimensional enumeration of the regions, such as a space filling curve.

In step 160, the index of the low discrepancy sequence for the region is scrambled using a masked hash value. Although not shown in FIG. 1, the masked hash may be generated based on the generated mask and the hash value, and a sample index for the low discrepancy sequence may be generated based on the generated masked hash and the current sample number.

An example of an algorithm as pseudo-code for steps 130-160 may read:
INTEGER hash=hash function(p.x,p.y);
INTEGER mask=(1 SHIFT_LEFT ROUND_DOWN (LOG_2(current_sample_no)))−1; // here LOG_2(0)=0
INTEGER masked_hash=hash AND mask;
INTEGER qMC_idx=current_sample_no EXCLUSIVE_OR masked_hash;

In the above code, "hash" corresponds to the hash value, "current_sample_no" corresponds to the current sample number, and qMC_idx corresponds to the sample index. As their names suggest, the "mask" and "masked_hash" correspond to the mask and the masked hash, respectively.

In step 170, a value for the region is computed using the function in the step 120 and the samples from the low discrepancy sequence of the region. Unlike a "standard" quasi Monte Carlo based renderer that uses the current sample number for an index, the illustrated method uses the sample index, e.g. "qMC_idx", to draw the actual sample from the low discrepancy sequence for the simulation process.

In one embodiment, the sampled vectors within the low discrepancy sequence may be enumerated per region such that an enumeration index may be associated with each region. In a related embodiment, a portion of the enumeration index (e.g. an upper half of the bits of the enumeration index, the most significant bits of the index, etc.) may be selected randomly but fixed. In another related embodiment, another portion of the enumeration index (e.g. a lower half of the bits of the enumeration index, the least significant bits of the index, etc.) may be selected randomly or pseudo-randomly.

Further, in one embodiment, the low discrepancy sequence may be partitioned into a plurality of low discrepancy sequences and the function with the set of regions as the domain may be used to select at least one of the partitions to compute a value for each region utilizing the selected partition of the low discrepancy sequence. In another embodiment, the function with the set of regions as the domain may be utilized to select an individual first index for each region, and the low discrepancy sequence may be enumerated, starting from the individual first index for each region.

Further still, in one embodiment, the function with the set of regions as the domain may be utilized to modify an order of the enumeration of the low discrepancy sequence per region. In another embodiment, the function with the set of regions as the domain may be utilized to determine an initial value for one or more deterministic methods to generate streams of pseudo-random numbers that mimic the properties of streams of random numbers. Also, a value for each region may be computed using the low discrepancy sequence modified by at least one of a Cranley-Patterson rotation, a scrambling, and a starting point utilizing the generated stream of pseudo-random numbers.

In the illustrated embodiment, the steps 130-170 are repeated for another region of the set of regions. The method 100 ends in step 180.

Figure 2:
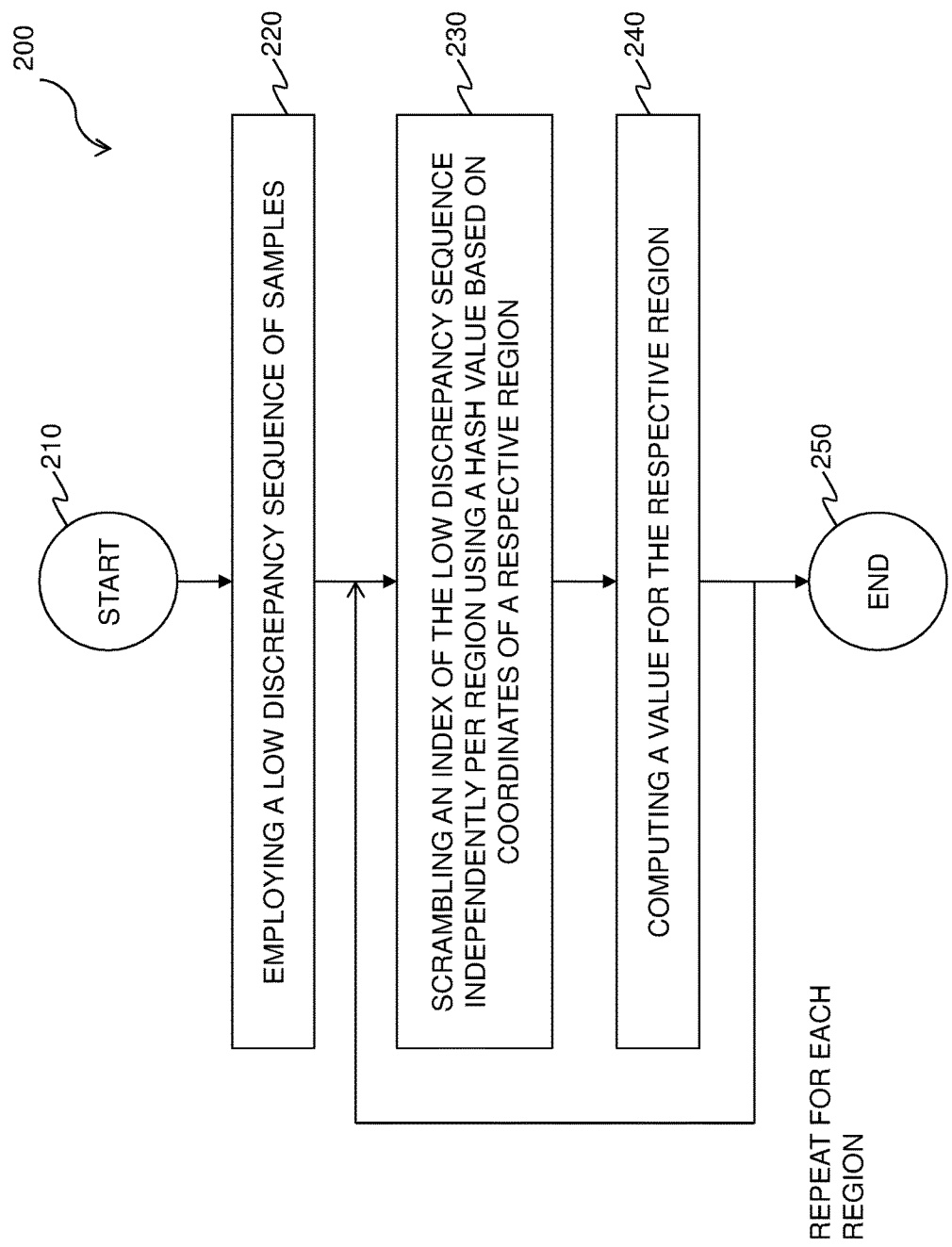
FIG. 2 is a flow diagram of one embodiment of a method for a progressive computation of a light transport simulation.

FIG. 2 is a block diagram of one embodiment of a method 200 for a progressive computation of a light transport simulation by using a function with a set of regions as a domain. In one embodiment, the set of regions may be a set of pixels of an image plane. In a related embodiment, each region of the set may correspond to each different pixel in the image plane. In another related embodiment, one region of the set may correspond to more than one pixel, e.g. when performing light tracing during the simulation.

In one embodiment, the method 200 may be performed by a processor in a system, e.g. a renderer, which will be described in more details below with respect to FIG. 3. In such an embodiment, the instructions that cause the processor to perform the steps of the method 200 may be stored in a non-transitory medium, which will also be described in more details below with FIG. 3. The method starts at start step 210.

In step 220, a low discrepancy sequence of samples for one of the regions is employed. In one embodiment, the low discrepancy sequence may include a plurality of sampled vectors of an image. For example, each vector within the low discrepancy sequence may represent a light transport path that is sampled within the image (e.g. a light transport path sampled from a high-dimensional path space within the image plane, etc.). In one embodiment, the low discrepancy sequence may be a (t,s)-sequence. In such an embodiment, the (t,s)-sequence may be a Sobol sequence. In yet another embodiment, the low discrepancy sequence may be a (t, m, s)-net in base 2. In still yet another embodiment, the low discrepancy sequence may be a rank-1 lattice sequence.

In step 230, an index of the low discrepancy sequence is scrambled per region. The step 230 is performed independently for each region using a hash value based on coordinates of each respective region. In one embodiment, a different scrambling is selected per region such that the correlation between neighboring regions can be effectively removed. The coordinates may be (x,y) coordinates of a region, e.g. a pixel. But as mentioned earlier, the coordinates are not limited to two dimensions.

In the illustrated embodiment, the hash value is generated from a crapwow function. Instead of the crapwow function, a different hash function may be selected to improve the perception of the image by the human visual system.

The step 230 includes generating a mask based on a current sample number of the region being scrambled. A current sample number is the current amount of samples that have already been drawn in a region. Once the mask is generated, a masked hash may be generated based on the generated mask and the hash value. Once the masked hash is generated, a sample index for the low discrepancy sequence may be generated based on the generated masked hash and the current sample number. An algorithm for the step 230 may be employed similar to the one provided above for the steps 130-160 of the method 100.

In step 240, a value for the scrambled region is computed using the function with a set of the regions as the domain and the samples from the low discrepancy sequence of the scrambled region.

In one embodiment, a value for each region may be computed using the low discrepancy sequence modified by at least one of a Cranley-Patterson rotation, a scrambling, and a starting point utilizing the generated stream of pseudo-random numbers. In another embodiment, the sampled vectors within the low discrepancy sequence may be enumerated per region such that an enumeration index may be associated with each region. In a related embodiment, a portion of the enumeration index (e.g. an upper half of the bits of the enumeration index, the most significant bits of the index, etc.) may be selected randomly but fixed. In another related embodiment, another portion of the enumeration index (e.g. a lower half of the bits of the enumeration index, the least significant bits of the index, etc.) may be selected randomly or pseudo-randomly.

In yet another embodiment, the low discrepancy sequence may be partitioned into a plurality of low discrepancy sequences and the function with the set of regions as the domain may be used to select at least one of the partitions to compute a value for each region utilizing the selected partition of the low discrepancy sequence. The function with the set of regions as the domain may be utilized to select an individual first index for each region, and the low discrepancy sequence may be enumerated, starting from the individual first index for each region.

In still yet another embodiment, the function with the set of regions as the domain may be utilized to modify an order of the enumeration of the low discrepancy sequence per region. The function with the set of regions as the domain may be utilized to determine an initial value for one or more deterministic methods to generate streams of pseudo-random numbers that mimic the properties of streams of random numbers.

In the illustrated embodiment, the steps 230 and 240 are repeated for each region of the set of regions of the image. The method ends in step 250.

Figure 3:
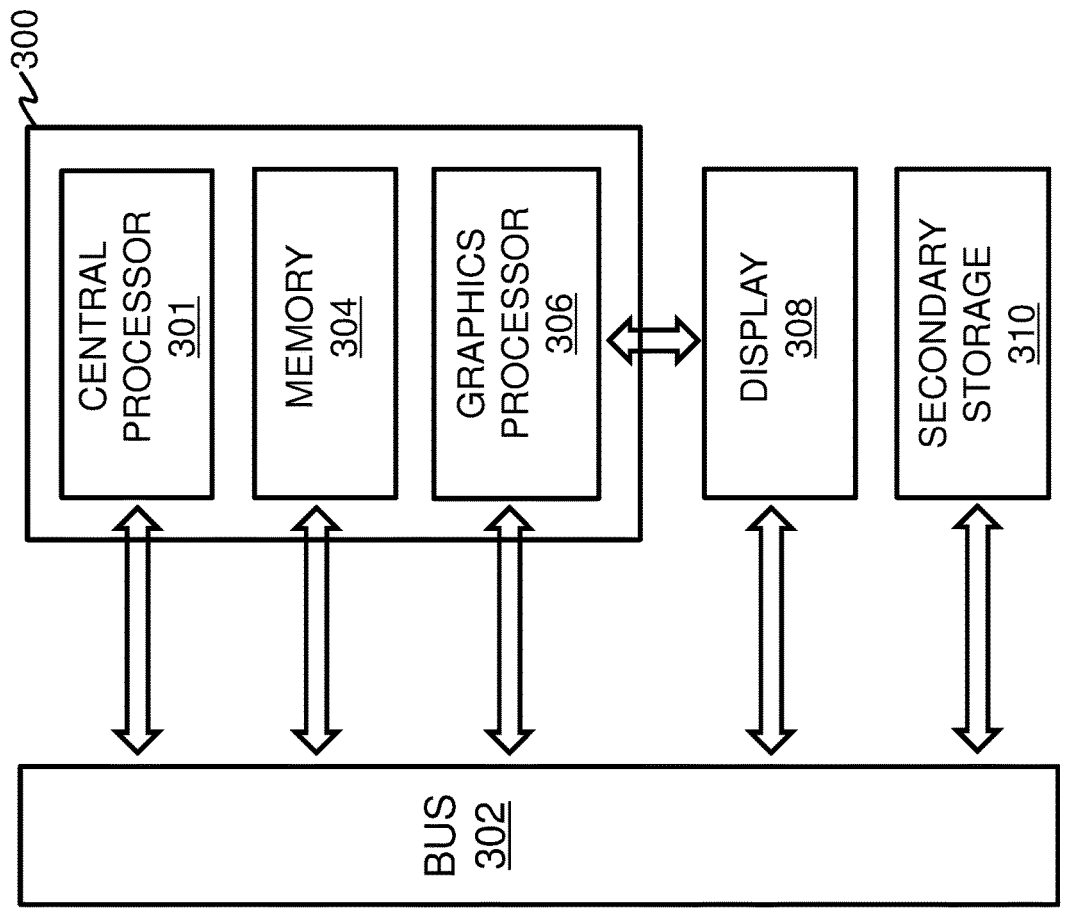
FIG. 3 is a block diagram of one embodiment of a system for a progressive computation of a light transport simulation.

FIG. 3 is a block diagram of one embodiment of a system 300, e.g. a renderer, in which the various architecture and/or functionality of the various previous embodiments may be implemented. As shown, the system 300 includes a central processor 301 which is connected to a communication bus 302. The system 300 also includes a memory 304. Control logic (e.g., software) and data are stored in the main memory 304 which may take the form of random access memory (RAM).

The system 300 also includes a graphics processor 306 and is connected to a display 308, i.e. a computer monitor. In one embodiment, the graphics processor 306 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulates on-chip operation, and make substantial improvements over utilizing a conventional central processing unit (CPU) and bus implementation. Of course, the various modules may also be situated separately or in various combinations of semiconductor platforms per the desires of the user. The system may also be realized by reconfigurable logic which may include (but is not restricted to) field programmable gate arrays (FPGAs).

The system 300 is connected to a secondary storage 310. The secondary storage 310 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 304 and/or the secondary storage 310. Such computer programs, when executed, cause the system 300, e.g. the processors within the system 300, to perform various functions, such as those disclosed herein. Memory 304, storage 310, volatile or non-volatile storage, and/or any other type of storage are possible examples of non-transitory computer-readable medium. As such, in one embodiment, a non-transitory computer-readable storage medium stores instructions that, when executed by a processor (e.g. the host processor 301 and/or the graphics processor 306), cause the processor to perform various methods, such as the methods 100 and 200.

The architecture and/or functionality of the various previous figures may also be implemented in the context of the central processor 301, the graphics processor 306, an integrated circuit (not shown) that is capable of at least a portion of the capabilities of both the host processor 301 and the graphics processor 306, a chipset, a group of integrated circuits designed to work and sold as a unit for performing related functions, etc.), and/or any other integrated circuit for that matter.

As such, in one embodiment, a renderer that is implemented across at least one of the processors, e.g. the central processor 301, the graphics processor 306, an integrated circuit, and a chipset a group of integrated circuits designed to work and sold as a unit for performing related functions, may be caused by the instructions stored in the non-transitory computer-readable medium to perform various methods such as the methods 100 and 200.

Still yet, the architecture and/or functionality of the various previous figures may be implemented in the context of a general computer system, a circuit board system, a game console system dedicated for entertainment purposes, an application-specific system, and/or any other desired system. For example, the system 300 may take the form of a desktop computer, laptop computer, and/or any other type of logic. Still yet, the system 300 may take the form of various other devices, including, but not limited to a personal digital assistant (PDA) device, a mobile phone device, a television, etc.

Further, while not shown, the system 300 may be coupled to a network (e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of an embodiment should not be limited by any of the above-described exemplary embodiments, but should be defined only in accordance with the following claims and their equivalents.

The above-described system and methods or at least a portion thereof may be embodied in or performed by various processors, such as digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system described herein.

Certain embodiments disclosed herein may further relate to computer storage products with a non-transitory computer-readable medium that have program code thereon for performing various computer-implemented operations that embody the apparatuses, the systems or carry out the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A method of enhancing a progressive computation of a light transport simulation using a function with a set of regions of an image plane as a domain, comprising:
    employing a low discrepancy sequence of samples; and
    scrambling an index of said low discrepancy sequence independently per region using a hash value based on coordinates of a respective region of said image plane, wherein for each set of a power-of-two number of said samples, said scrambling is a permutation.

2. The method of claim 1, wherein said low discrepancy sequence is a (t, s) sequence, a (t, m, s) net in base two, or a rank-1 lattice sequence.

3. The method of claim 2, wherein the (t, s) sequence is a Sobol sequence.

4. The method of claim 1, wherein said regions are pixels of an image, identified by (x, y) coordinates.

5. The method of claim 1, wherein the hash value is generated from a hash function.

6. The method of claim 1, wherein sampled vectors in said low discrepancy sequence are enumerated per region such that an enumeration index is associated with each region, one portion of said enumeration index being selected randomly but fixed, and another portion of the enumeration index being selected randomly or pseudo-randomly.

7. The method of claim 1, wherein said low discrepancy sequence is partitioned into a plurality of low discrepancy sequences and said function with said set of regions as said domain is used to select at least one of said partitions to compute a value for each region utilizing said selected partition.

8. The method of claim 1, further comprising utilizing said function with said set of regions as said domain to select an individual first index for each region, and said low discrepancy sequence is enumerated, starting from said individual first index for each region.

9. The method of claim 1, further comprising utilizing said function with said set of regions as said domain to modify an order of an enumeration of said low discrepancy sequence per region.

10. The method of claim 1, further comprising utilizing said function with said set of regions as said domain to determine an initial value for one or more deterministic methods to generate streams of pseudo-random numbers that mimic properties of streams of random numbers.

11. The method of claim 10, further comprising computing a value for each of said regions using said low discrepancy sequence modified by at least one of a Cranley Patterson rotation, a scrambling, and a starting point utilizing the generated stream of pseudo-random numbers.

12. The method of claim 1, wherein said scrambling is repeated for each of said regions.

13. A method for a progressive computation of a light transport simulation comprising:
    employing a function with a set of regions of an image plane as a domain;
    scrambling an index of a low discrepancy sequence of samples of one region of said regions independently of other regions of said regions using a hash value based on coordinates of said one region; and
    computing a value for said one region of said image plane using said function and said samples, wherein for each set of a power-of-two number of said samples, said scrambling is a permutation.

14. The method of claim 13, wherein said scrambling and said computing are repeated for another region of said regions.

15. The method of claim 13, wherein said scrambling includes generating a mask based on a current sample number in said region.

16. The method of claim 15, wherein said scrambling includes calculating a masked hash based on said hash value and said mask.

17. The method of claim 16, wherein said scrambling includes determining a sample index for said low discrepancy sequence based on said masked hash and said current sample number.

18. The method of claim 13, wherein each region of said regions is identified by coordinates of said each region or an enumeration based on said coordinates.

19. A renderer for a progressive computation of a light transport simulation, comprising:
 a processor; and
 a non-transitory computer-readable storage medium storing instructions that, when executed by said processor, cause the processor to perform steps comprising:
 employing a function with a set of regions of an image plane as a domain;
 scrambling an index of a low discrepancy sequence of samples of one region of said regions of said image plane independently of other regions of said regions said image plane using a hash value based on coordinates of said one region, and
 computing a value for said one region using said function and said samples, wherein for each set of a power-of-two number of said samples, said scrambling is a permutation.

20. The renderer of claim 19, wherein said steps of scrambling and computing are repeatedly performed by said processor for another region of said regions.

21. The renderer of claim 19, wherein each region of said regions corresponds to each pixel, identified by (x, y) coordinates.

* * * * *